March 4, 1930.  M. W. COOKE  1,749,209

CONDUCTOR SUPPORT

Filed Feb. 18, 1929

Inventor

MILTON W. COOKE

By

Attorney

Patented Mar. 4, 1930

1,749,209

UNITED STATES PATENT OFFICE

MILTON W. COOKE, OF PITTSBURGH, PENNSYLVANIA, ASSIGNOR TO THE OHIO BRASS COMPANY, OF MANSFIELD, OHIO, A CORPORATION OF NEW JERSEY

CONDUCTOR SUPPORT

Application filed February 18, 1929. Serial No. 340,706.

This invention relates to a conductor support and particularly a support for suspending a trolley wire from an overhead construction.

The object of this invention is to provide a device of increased life over present devices on the market and this is accomplished through the construction used which permits the use of very high grade materials for that part which contacts with a moving current collector and is subjected to friction and arcing.

Another object is to provide for the renewal of the portion which is subjected to wear, leaving the balance of the device undisturbed during such renewal.

Another object of the device is to provide means not only for supporting the trolley wire but to grip the same with respect to the device.

The invention resides in the new and novel construction, arrangement and combination of the various parts hereinafter disclosed and shown in the drawing.

In the drawing:—

Figure 4:
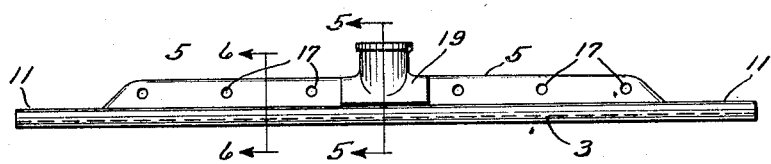
Fig. 4 is a side view in elevation of the supporting portion or member.
Figure 5:
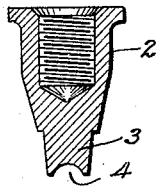
Figure 6:
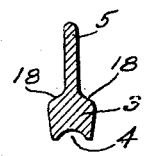

Figs. 5 and 6 are enlarged views of Fig. 4 on the lines 5—5 and 6—6 respectively.

Figure 7:
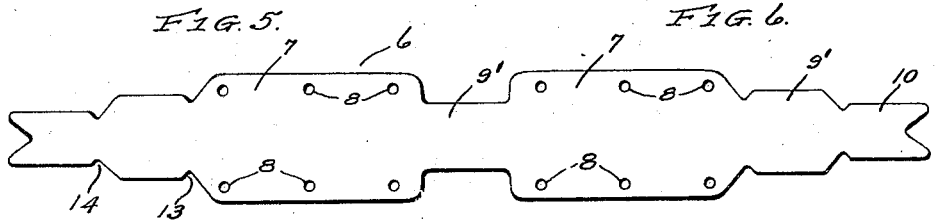

Fig. 7 is a plan view of the wearing unformed portion and which I hereinafter term a sleeve.

Figure 8:
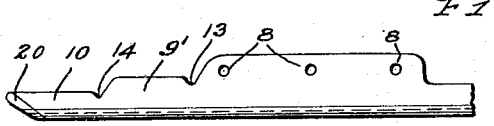

Fig. 8 is a side view in elevation of a portion of Fig. 7 after being formed.

Figure 9:
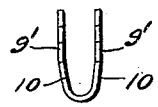

Fig. 9 is an enlarged end view of Fig. 8.

The preferred embodiment of this invention comprises a supporting member 1 provided with an internally threaded boss 2, a longitudinally extending portion 3 provided in its lower edge with a groove 4 to receive the trolley wire and web portions 5 uniting the boss 2 and longitudinal member 3 in a secure and permanent relation and unitary element 1.

The sleeve portion 6 is formed up of sheet material such as copper, either hard drawn or annealed, or any of the various copper base alloys such as phosphor bronze, etc. Such metal is very dense and has a fibrous structure due to the nature of its manufacture which is not found in a casting even of the same composition. For this reason the life of the sleeve 6 is materially increased by making it of the material specified or the equivalent, and even with a thickness of the preferred material equal to that of the thickness of a cast sleeve, the life of the herein proposed material is very much greater than that of the cast sleeve.

The sleeve 6 is first stamped out of sheet material to a form of that shown in Fig. 7 and comprises the holding portions 7 with the holes 8 and the neck portion 9. Projecting from the holding portions 7 are portions 9' and 10.

The portion 6 as shown in Fig. 7 is formed up into a U-shaped member as shown in Figs. 8 and 9 so as to receive the supporting member 1. The portions 9' and 10 are adapted to fold around the projecting ends 11 of the longitudinal member 3 and around the trolley wire 12 respectively, and in order to facilitate such bending operation member 6 is provided with the notches 13 and 14.

In using this invention the member 1 is first applied to an overhead support such as a trolley wire hanger through the medium of the threaded boss 2. The trolley wire, which has previously been strung in place, is positioned within the sleeve, which in turn is then positioned upon the member 1 and held in such position by means of the screw 15 and nut 16, passing the screw 15 through the holes 8 in the sleeve 6 and corresponding holes 17 in the member 1.

Figure 1:
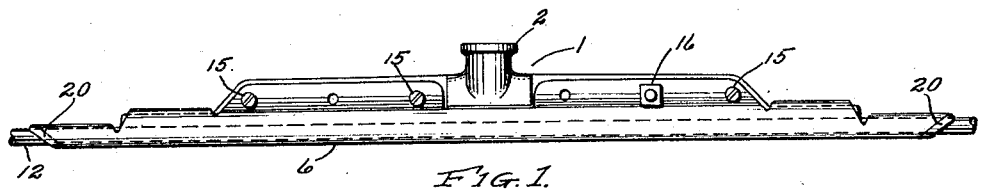
Fig. 1 is a side view in elevation of the invention with a trolley wire in position.
Figure 2:
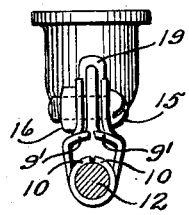
Fig. 2 is an enlarged end view of Fig. 1.

The operation thus far is sufficient to hold the parts in relation to each other but the trolley wire is not as yet gripped into position and to bring this about through the drawing up of the screws and nuts 15—16, the web portions 5 are made much narrower than the longitudinal portion 3 thereby forming shoulders 18 around which the metal of the sleeve 6 is drawn, thereby drawing the portion of the sleeve 6 contacting with the trolley wire 12 upwardly and drawing the trolley wire into engagement with the longitudinal member 3. This drawing action will be appreciated by an examination of Figs. 2 and 3.

To further secure the parts together, the lip portions 9' are peened over into engagement with the projecting portions 11 of the member 1 and the lip portions 10 are peened over into engagement with the trolley wire 12.

Figure 3:
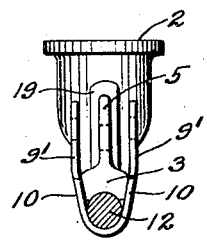
Fig. 3 is an enlarged end view of Fig. 1 before the parts have been drawn and folded into final engagement with the trolley wire.

The portion 19 of the member 1 immediately adjacent the boss 2 is considerably thicker than the web portions 5, as will be apparent from Fig. 3, and this will permit the outer surface of the portions 7 of the sleeve to be practically flush with the surface of the portion 19 when the portions 7 are drawn into contact with the side faces of the webs 5. Also, the portion 3 immediately below the portion 19 is of reduced cross section and when the neck portion 9 is in position, it fills out the difference in the thickness of these parts and presents substantially no interference with the passage of the current controller at this point.

After the member 6 has been formed as in Fig. 8, the extreme ends of the member 6 are reduced to a knife edge condition as indicated at 20 in order to present a smooth passage for the current collector in passing from the trolley to the sleeve and vice versa. Tapering the ends of the sleeve 6 is preferably done after the member 6 has been formed to a U-shape.

The member 1 may be of a ferrous or non-ferrous metal, either cast or forged.

It will be evident to those skilled in the art that the member 6, which is subject to wear, will have a greater life than a cast member of the same thickness due to the superior quality of a drawn or rolled material of cast material for this particular service, and it will also be evident that the trolley wire can be gripped rigidly in position and held there not only through the gripping of the screws and nuts 15—16, but also through the gripping of the tubular end portion formed by the lips 10.

In renewing the wearable portion 6, it is not necessary to disturb the portion 1.

The screws and nuts 15—16 will be found to remain tight due to the fact that the nut itself cannot rotate (see Fig. 2), and the screw is kept from turning through the spring action, as it were, of the member 6.

The projecting portion 11 may be omitted if desired and with it the portion 9' of the sleeve, and the portion 10 would then join onto the portion 7 and be formed about the trolley wire as already explained. This gives the support spring or yielding ends.

The herein disclosed invention is claimed as follows:

1. A conductor support comprising a support member having means for attachment to a structure and a longitudinally disposed surface thereon for engagement with a conductor, a U-shaped sleeve to contact with the opposite side of the conductor from the said surface and transversely disposed means to engage oppositely disposed portions of the sleeve and draw such portions towards each other and simultaneously draw the support member and sleeve towards each other to grip the conductor and to secure the support and sleeve together.

2. A conductor support comprising a support member having means for attachment to a structure and a longitudinally disposed surface thereon for engagement with a conductor, a U-shaped sleeve to contact with the opposite side of the conductor from the said surface and a plurality of means spaced along the support member on each side of the attachment means to draw the support member and sleeve towards each other to grip the conductor and to secure the support and sleeve together.

3. A conductor support comprising a support member having means for attachment to a structure and a longitudinally disposed bar with a surface to contact with the conductor, oppositely extending upstanding ribs securing the said means and bar together, a U-shaped sleeve mounted to support the conductor and move the conductor into engagement with the surface on the bar and adjustable means extending through the sleeve and ribs to secure and maintain the said parts together and draw the sleeve, conductor and bar into close engagement.

4. A conductor support comprising a support member having a boss for attachment to a supporting structure and a longitudinally disposed bar provided with a surface to contact with the conductor, oppositely extending ribs from the said boss and upstanding with respect to the bar and of less thickness than that of the bar to provide shoulders on opposite sides of the ribs, a U-shaped sleeve to support the conductor in contact with the said surface on the bar and means to draw the sides of the sleeve towards the ribs and over the said shoulders to move the bight of the sleeve towards the bar to grip the conductor.

5. A conductor support comprising a support member having a support boss, a longitudinally disposed bar having a conductor engaging surface, ribs extending in opposite directions from the boss and secured to the bar but of less length than the bar, a U-shaped sleeve to support the conductor and having a portion disposed at the sides of the ribs, means for securing the said portions to the ribs and U-shaped extensions from the said portions on the sleeve adapted to have the free ends thereof bent over the projecting portion of the bar.

6. A conductor support comprising a support member, having a supporting boss, ribs extending in opposite directions from the boss, a bar supported by the boss and ribs and extending beyond the extreme ends of the ribs and having a conductor engaging surface, a U-shaped sleeve to enclose the bar and support the conductor and having portions disposed at the sides of the ribs and other U-shaped portions to engage and be folded over the extending parts of the bar and other U-shaped portions to be folded about the conductor beyond the ends of the bar and means to secure the sleeve in position on the support.

7. A conductor support comprising a supporting member provided with a boss, ribs extending from the boss in opposite directions and a bar portion supported by the boss and ribs and having a conductor engaging surface, a U-shaped sleeve to enclose the bar and support the conductor relative to the supporting member and having U-shaped projecting portions extending beyond the ends of the supporting member and arranged to fold over the upper surface of the conductor extending beyond the supporting member and means to secure the sleeve and supporting member together.

8. A sleeve member for a conductor support comprising a U-shaped member formed up from a single sheet of non-ferrous metal and having a portion with oppositely disposed sides and registering holes through the sides adjacent the free ends thereof, a shallow U-shaped portion connecting the first said portion, other U-shaped portions projecting from the first portions and in line therewith but of less depth than the said first portions and adopted to have their free ends folded inwardly to form tubular portions.

In testimony whereof I affix my signature.

MILTON W. COOKE.